United States Patent [19]

Hakamata

[11] Patent Number: 5,214,279
[45] Date of Patent: May 25, 1993

[54] SCANNING MICROSCOPE AND TUNING FORK SCANNING MECHANISM FOR VARYING THE WIDTH OVER WHICH A SAMPLE IS SCANNED

[75] Inventor: Kazuo Hakamata, Kanagawa, Japan

[73] Assignee: Fuji Photo Film Co., Ltd., Kanagawa, Japan

[21] Appl. No.: 735,734

[22] Filed: Jul. 25, 1991

[30] Foreign Application Priority Data

| Jul. 26, 1990 | [JP] | Japan | 2-198550 |
| Aug. 2, 1990 | [JP] | Japan | 2-205707 |
| Jan. 24, 1991 | [JP] | Japan | 3-7238 |
| Mar. 6, 1991 | [JP] | Japan | 3-40170 |
| May 15, 1991 | [JP] | Japan | 3-110234 |

[51] Int. Cl.$^5$ ............................ G02B 26/10
[52] U.S. Cl. ............................ 250/234; 250/235
[58] Field of Search ........... 250/234, 235, 236, 216;
359/368, 214, 213; 356/244; 358/199; 267/134, 160

[56] References Cited

U.S. PATENT DOCUMENTS

| 3,628,781 | 12/1971 | Grib | 267/154 |
| 3,666,974 | 5/1972 | Dostal | 310/8.2 |
| 3,727,151 | 4/1972 | Koehler | 331/116 M |
| 4,859,846 | 8/1989 | Burrer | 250/234 |
| 4,902,083 | 2/1990 | Wells | 359/221 |
| 5,009,473 | 4/1991 | Hunter et al. | 359/214 |
| 5,081,350 | 1/1992 | Iwasaki | 250/234 |

FOREIGN PATENT DOCUMENTS 62-217218 9/1987 Japan.

Primary Examiner—Jack I. Berman
Assistant Examiner—Jim Beyer
Attorney, Agent, or Firm—Sughrue, Mion, Zinn, Macpeak & Seas

[57] ABSTRACT

A scanning microscope comprises a sample supporting member on which a sample is supported, an optical device which irradiates a light beam to the sample, and a movement mechanism which moves the optical device with respect to the sample supporting member such that the light beam scans the sample. A device photoelectrically detects light radiated out of the portion of the sample, which is exposed to the light beam, an image of the sample being thereby formed. The movement mechanism for moving the optical device or the sample supporting member is constituted of a tuning fork on which the optical device or the sample supporting member is supported, and an excitation device for applying force, the magnitude of which changes periodically, to the tuning fork, and thereby causing the tuning fork to resonate.

10 Claims, 12 Drawing Sheets

F I G. 11
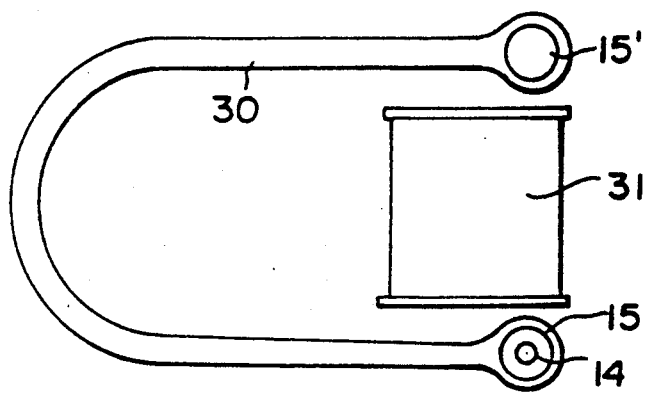
F I G. 12
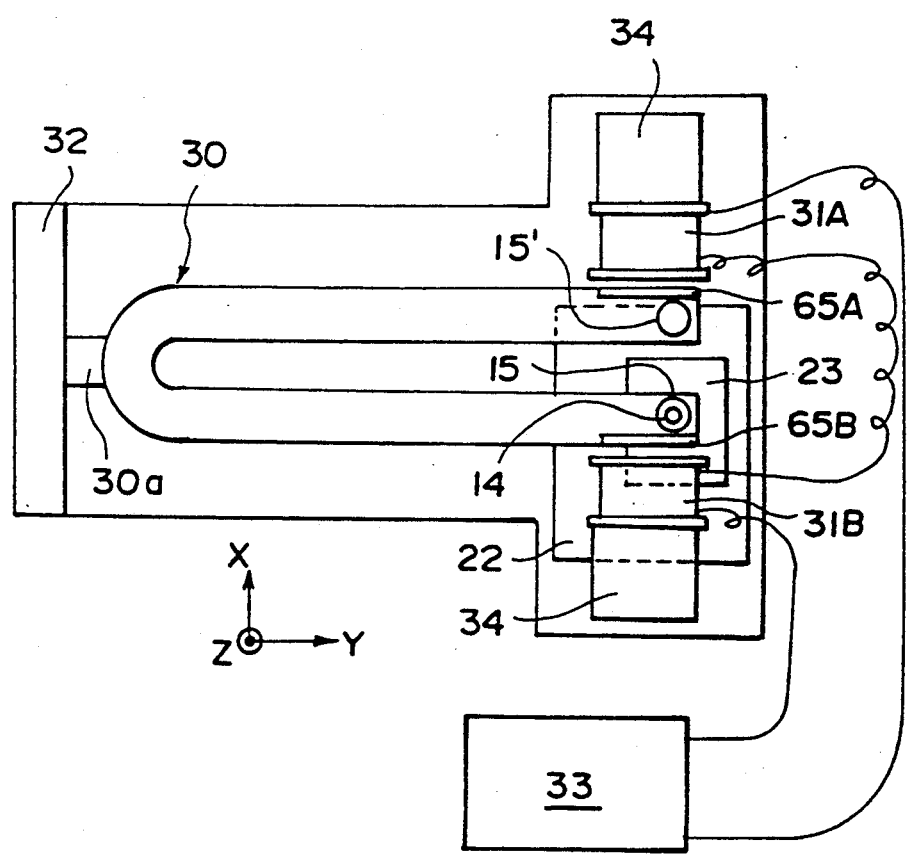

SCANNING MICROSCOPE AND TUNING FORK SCANNING MECHANISM FOR VARYING THE WIDTH OVER WHICH A SAMPLE IS SCANNED

BACKGROUND OF THE INVENTION

1. Field of the Invention

This invention relates to an optical type scanning microscope. This invention particularly relates to a scanning microscope, wherein a sample supporting member or an optical means for irradiating a light beam to a sample is supported on a tuning fork, and the tuning fork is caused to vibrate such that the sample may be scanned with the light beam. This invention also relates to a novel scanning mechanism.

2. Description of the Prior Art

Optical type scanning microscopes have heretofore been used. With the scanning microscope, a light beam is converged to a small light spot on a sample, and the sample is two-dimensionally scanned with the light spot. The light beam, which has passed through the sample during the scanning, the light beam, which has been reflected from the sample during the scanning, or the fluorescence, which is produced by the sample during the scanning, is detected by a photodetector. An enlarged image of the sample is thereby obtained. An example of the scanning microscope is disclosed in Japanese Unexamined Patent Publication No. 62(1987)-217218.

In the conventional optical type scanning microscopes, a mechanism which two-dimensionally deflects a light beam by a light deflector is primarily employed as the scanning mechanism.

However, the scanning mechanism described above has the drawback in that a light deflector, such as a galvanometer mirror or an acousto-optic light deflector (AOD), which is expensive must be used. Also, with the scanning mechanism described above, a light beam is deflected by a light deflector. As a result, the angle of incidence of the deflected light beam upon an objective lens of the light projecting optical means changes momentarily, and aberration is caused to occur. Therefore, the scanning mechanism described above also has the problem in that it is difficult for the objective lens to be designed such that aberration can be eliminated. Particularly, in cases where an AOD is utilized, astigmatism occurs in the light beam radiated out of the AOD. Therefore, in such cases, a special correction lens must be used, and the optical means cannot be kept simple.

In order to eliminate the aforesaid problems, a scanning mechanism has heretofore been proposed wherein a light beam is not deflected but a sample is scanned with the light spot of the light beam by two-dimensionally moving a sample supporting member. Also, in U.S. patent application Ser. No. 587,122, a novel mechanism has been proposed wherein a light projecting optical means and a light receiving optical means are supported on a single movable member, the movable member is moved while the a sample supporting member is kept stationary, and a light spot of a light beam is thereby caused to scan a sample.

In cases where the scanning with the light spot of a light beam is carried out by moving an optical means with respect to a sample supporting member, the optical means or the sample supporting member should be moved quickly such that the time required for an image of the sample to be formed may be kept short. For this purpose, by way of example, a piezo-electric device or an ultrasonic vibrator may be utilized as the drive source for moving the sample supporting member or the optical means.

However, in general, a device which can vibrate quickly has the drawback in that the amplitude of movement is small. A device which can vibrate with a large amplitude of movement has the drawback in that the speed of vibration cannot be kept high. If the amplitude of movement is small, the width, over which the light spot of the light beam scans a sample, must be set to a small value, and therefore a microscope image of a large area of the sample cannot be obtained.

In cases where a microscope image of a large area of a sample cannot be obtained, considerable time and labor are required to find the part of the image, which it is necessary to reproduce ultimately as a visible image, i.e. to find the field of view. In order for a microscope image of a large area of the sample to be reproduced, a plurality of images of a small areas of the sample may be combined and a composite image may thereby be reproduced. However, in such cases, a long time is required to carry out the combining process, and therefore the time required for a microscope image to be reproduced cannot be kept short. Also, in such cases, if the positions of the plurality of the images to be combined are adjusted accurately, the problem will occur in that joints between the images thus combined appear in the composite image.

In cases where the magnification, with which a microscope image is formed, is to be changed in the aforesaid optical type scanning microscopes, an objective lens has heretofore been exchanged as in ordinary non-scanning types of microscopes. Alternatively, a zoom lens incorporated in the microscopes has heretofore been operated as in ordinary non-scanning types of microscopes. However, with these techniques, considerable time and labor are required to carry out such operations, and the operating efficiency of the scanning microscopes cannot be kept high.

When a sample supporting member or an optical means is moved by a piezo-electric device, an ultrasonic vibrator, or the like, the magnification, with which a microscope image is formed, can be altered by changing the amplitude of movement. However, as described above, with such a device, it is difficult for the amplitude of movement to be kept large. When the amplitude of movement is small, the scale of reduction or enlargement of the image cannot be kept large.

Also, in the course of periodically sampling the output of a photodetector in accordance with a sampling clock signal (i.e. a pixel clock signal), the magnification, with which a microscope image is formed, can be altered by changing the frequency of the sampling clock signal.

However, in such cases, particularly when a piezo-electric device is employed, a hysteresis occurs with the drive voltage vs. displacement characteristics, and the hysteresis curve varies markedly in accordance with the amplitude, temperature, or the like. In order to cope with the variation in the hysteresis curve, the drive voltage waveform for the piezo-electric device and the timing, with which a sampling clock signal is generated, must be changed in accordance with the amplitude, temperature, or the like. Therefore, the scanning microscope cannot be kept simple in configuration, and the cost thereof cannot be kept low.

SUMMARY OF THE INVENTION

The primary object of the present invention is to provide a scanning microscope, wherein the width, over which a light spot of a light beam scans a sample, can be set to a large value, and a microscope image of a large area of the sample can be obtained.

Another object of the present invention is to provide a scanning microscope, wherein an image of a large area of a sample can be viewed in the course of, for example, finding a field of view, and quick scanning can be carried out when an image of a small area of a sample is to be viewed.

A further object of the present invention is to provide a scanning microscope, wherein the magnification, with which a microscope image is formed, can be easily changed continuously over a wide range, and wherein the configuration is kept simple and the cost is kept low.

A still further object of the present invention is to provide a novel scanning mechanism.

The present invention provides a scanning microscope comprising:

i) a sample supporting member on which a sample is supported, ii) an optical means which irradiates a light beam to said sample, iii) a movement mechanism which moves said optical means with respect to said sample supporting member such that said light beam scans said sample, and iv) a means for photoelectrically detecting light radiated out of the portion of said sample, which is exposed to said light beam, an image of said sample being thereby formed, wherein said movement mechanism for moving said optical means or said sample supporting member is constituted of:

a) a tuning fork on which said optical means or said sample supporting member is supported, and b) an excitation means for applying force, the magnitude of which changes periodically, to said tuning fork, and thereby causing said tuning fork to resonate.

As will be understood from the specification, it should be noted that the term "moving an optical means with respect to a sample supporting member" as used herein means movement of the optical means relative to the sample supporting member, and embraces the cases wherein the optical means is moved while the sample supporting member is kept stationary, cases wherein the sample supporting member is moved while the optical means is kept stationary, and cases wherein both the optical means and the sample supporting member are moved.

In cases where the tuning fork is constituted of a magnetic material, the excitation means may be composed of an electromagnet for applying a magnetic field, the strength of which changes periodically, to the tuning fork and a driving circuit for operating the electromagnet. The electromagnet may be independent of and separate from the tuning fork, or may be formed by winding an exciting coil around the tuning fork.

Alternatively, the tuning fork may be constituted of a non-magnetic material, and a magnetic material may be secured to the tuning fork. In such cases, the excitation means may be composed of an electromagnet for applying a magnetic field, the strength of which changes periodically, to the magnetic material and a driving circuit for operating the electromagnet.

As another alternative, the excitation means may be constituted of a piezo-electric device, which is secured to the tuning fork, and a driving circuit for applying a voltage, the magnitude of which changes periodically, to the piezo-electric device and thereby imparting a periodically repeated strain.

When the tuning fork is caused to resonate in the manner described above, a larger amplitude can be obtained than when an optical means or a sample supporting member is moved directly by a piezo-electric device, an ultrasonic vibrator, or the like. Therefore, with the scanning microscope in accordance with the present invention, the width, over which the optical means moves with respect to the sample supporting member, i.e. the width, over which the light beam scans the sample, can be kept large. Accordingly, an image of a large area of the sample can be formed.

In cases where the excitation means is provided with an electromagnet, which is independent of and separate from the tuning fork, the distance between the electromagnet and the tuning fork should be adjusted such that the tuning fork may not strike against the electromagnet when it vibrates. Such a requirement need not be satisfied in cases where the excitation means is provided with a piezo-electric device or an electromagnet, which is formed by winding an exciting coil around the tuning fork. Therefore, the scanning microscope, wherein the excitation means is provided with a piezo-electric device or an electromagnet, which is formed by winding an exciting coil around the tuning fork, is advantageous in obtaining a large width, over which the optical means moves with respect to the sample supporting member.

In cases where the excitation means is provided with a piezo-electric device, the material of the tuning fork is not limited to a magnetic material, but may be selected from those which can vibrate easily with a large amplitude. Therefore, also for this reason, the scanning microscope, wherein the excitation means is provided with a piezo-electric device, is advantageous in obtaining a large width, over which the optical means moves with respect to the sample supporting member. This also applies when the tuning fork is constituted of a nonmagnetic material, and a magnetic material is secured to the tuning fork. How such effects can be obtained will hereinbelow be described in detail.

The amount of displacement of a tuning fork, which is caused to vibrate by external force F, is proportional to $FL^3/3EI$, where E represents the modulus of elasticity of the material of the tuning fork, L represents the length of the tuning fork, and I represents the moment of inertia of area. The modulus of elasticity E of materials, which have heretofore been used to constitute tuning forks in conventional apparatuses, for example, soft magnetic materials, such as SS41 and S45C, is very large (19,000 kg/mm$^2$). The modulus of elasticity E of an aluminum alloy A5056, which is a non-magnetic material, is very small (7,200 kg/mm$^2$). Therefore, when the shape of the tuning fork and the force F applied thereto are the same, the amount of displacement of a tuning fork constituted of an aluminum alloy A5056 is 2.6 ($=19,000/7,200$) times as large as the amount of displacement of a tuning fork constituted of SS41 or S45C. When a large amplitude of the tuning fork is thus obtained, the width, over which a light beam scans a sample, can be set to a large value, and a microscope image of a large area of the sample can be obtained.

Also, in cases where the material of the tuning fork is not limited to a magnetic material, but may be selected from a variety of materials, a material can be selected such that the resonant frequency of the tuning fork may be as high as possible. Specifically, when the shape of the tuning fork and the force F applied thereto are the same, the relationship expressed as $f\alpha(E/\rho)^{\frac{1}{2}}$ obtains, where f represents the resonant frequency, and p represents the density of the material of the tuning fork. For example, $E/\rho = 7,400/2.64 = 2,800$ for an aluminum alloy A5052 which is a non-magnetic material, and $E/\rho = 19,000/7.9 = 2,400$ for SS41. Therefore, when the tuning fork is constituted of the aluminum alloy A5052, the resonant frequency f is $(2,800/2,400)^{\frac{1}{2}} = 1.08$ times the resonant frequency of a tuning fork constituted of SS41. If the resonant frequency f is high, the scanning frequency becomes high. Therefore, the scanning with a light beam can be carried out quickly, and the time required for an image to be formed can be kept short.

Also, with the scanning microscope in accordance with the present invention, the means for scanning with a light beam is constituted of a tuning fork, an electromagnet or an piezo-electric device, and a simple electric circuit. Therefore, the whole configuration of the scanning microscope in accordance with the present invention can be kept simple. Also, the scanning microscope in accordance with the present invention can be manufactured at a low cost, and has good stability and reliability.

The second object of the present invention is accomplished by a scanning microscope wherein the excitation means is provided with the electromagnet, and the driving circuit for operating the electromagnet selectively feeds a driving current, the magnitude of which changes at the frequency of the first overtone of the tuning fork, or a driving current, the magnitude of which changes at the frequency of the third overtone of the tuning fork, to the electromagnet.

The second object of the present invention is also accomplished by a scanning microscope wherein the excitation means is constituted of a piezo-electric device and a driving circuit for operating the piezo-electric device, and the driving circuit for operating the piezo-electric device selectively applies a driving voltage, the magnitude of which changes at the frequency of the first overtone of the tuning fork, or a driving voltage, the magnitude of which changes at the frequency of the third overtone of the tuning fork, to the piezo-electric device.

The frequency of the third overtone of the tuning fork is 6.75 times the frequency of the first overtone. The amplitude of vibration at the first overtone is larger than the amplitude of vibration at the third overtone.

Therefore, when the tuning fork is vibrated at the first overtone in the course of finding the field of view, a sample can be scanned over its wide area. When a microscope image to be used is formed, the tuning fork may be vibrated at the third overtone. In such cases, even if the area of the sample, the image of which can be formed, becomes small, the scanning with the light beam can be carried out quickly. Therefore, the time required for an image to be formed can be kept short.

The third object of the present invention is accomplished by a scanning microscope wherein the excitation means is provided with the electromagnet, and the driving circuit for operating the electromagnet feeds a driving current, the magnitude of which is variable, to the electromagnet.

In cases where a magnetic field, the strength of which changes periodically, is applied to the tuning fork in order to vibrate it, the amplitude of the tuning fork becomes larger as the strength of the magnetic field is larger. The strength of the magnetic field is proportional to the value of the current applied to the electromagnet. Therefore, when the value of the current is changed, the amplitude of the tuning fork changes, and the width, over which the light beam scans a sample, is thereby caused to change. Accordingly, the area of the field of view and the magnification of the image formed can be changed.

Also, the magnification of the image formed can be changed electrically, and therefore easily. Accordingly, the operation for finding the field of view, or the like, can be carried out very easily.

The third object of the present invention is also accomplished by a scanning microscope wherein the excitation means is constituted of a piezo-electric device and a driving circuit for operating the piezo-electric device, and the driving circuit for operating the piezo-electric device applies a driving voltage, the magnitude of which is variable, to the piezo-electric device.

In cases where the tuning fork is vibrated by a periodical strain of the piezo-electric device, the amplitude of the tuning fork becomes larger as the strain of the piezo-electric device is larger. The strain of the piezo-electric device is proportional to the value of the voltage applied to the piezo-electric device. Therefore, when the value of the voltage is changed, the amplitude of the tuning fork changes, and the width, over which the light beam scans a sample, is thereby caused to change. Accordingly, the area of the field of view and the magnification of the image formed can be changed.

In cases where the optical means is supported at an edge part of the tuning fork, the middle part of the tuning fork should preferably be thinner than the edge part of the tuning fork, at which the optical means is supported. The width of the tuning fork should more preferably be changed smoothly in the region between the edge part, at which the optical means is supported, and the middle part, which is thinner than the edge part. Also, the surface of the tuning fork, which faces the electromagnet, should preferably be flat such that the distance between said surface and the electromagnet may be constant.

Effects from designing the shape of the tuning fork in the manner described above will be described hereinbelow. FIG. 7 shows a basic shape of a tuning fork. FIG. 8 shows a basic shape of a tuning fork wherein the middle part is thinner than an edge part, at which an optical means is supported. In FIGS. 7 and 8, reference numeral 30 represents a tuning fork, and reference numeral 31 represents an electromagnet. Reference numeral 15 represents an optical means. In each of FIGS. 7 and 8, the optical means 15 is embedded in an edge part of the tuning fork 30 such that the optical axis of the optical means 15 extends along a line normal to the plane of the sheet of FIG. 7 or 8. When the electromagnet 31 applies a magnetic field, the strength of which changes periodically, to the tuning fork 30, the optical means 15 reciprocally vibrates in the directions indicated by the double headed arrow X.

When the tuning fork 30 is caused to vibrate in the manner described above, the amplitude of vibration is inversely proportional to the third power of the width L of the tuning fork 30. The amplitude of vibration of the tuning fork 30 is also inversely proportional to the height, t, of the tuning fork 30. The width L of the tuning fork 30 can be kept smaller in FIG. 8 than in FIG. 7. Therefore, in cases where the size of the optical means 15 is the same, the amplitude of vibration of the tuning fork 30 can be kept larger in FIG. 8 than in FIG. 7. Accordingly, the width, over which a light beam projected from the optical means 15 scans a sample, can be kept larger in FIG. 8 than in FIG. 7.

The scanning microscope in accordance with the present invention may be provided with a tuning fork 30 having a shape shown in FIG. 9. In FIG. 8, the distance, a, between the tuning fork 30 and the electromagnet 31 is constant. On the other hand, in FIG. 9, the distance, a, between the edge part of the tuning fork 30 and the electromagnet 31 is comparatively small, and the distance, a', between the middle part of the tuning fork 30 and the electromagnet 31 is larger than the distance, a. The amplitude of vibration of the tuning fork 30 is proportional to the magnetic flux density B applied to the tuning fork 30. The magnetic flux density B is inversely proportional to the distance between the tuning fork 30 and the electromagnet 31. Therefore, from the point of view of keeping the amplitude of vibration of the tuning fork 30 large, the configuration shown in FIG. 8 is advantageous over the configuration shown in FIG. 9.

Also, when the tuning fork is kept thin, the length of the tuning fork can be kept short if the same frequency is to be obtained. Therefore, the scanning microscope can be kept small in size and light in weight. Also, a small electromagnet may be employed, and the level of the voltage for driving the electromagnet can be kept low.

In FIGS. 10 and 11, the width of the tuning fork 30 is changed smoothly in the region between the edge part, at which the optical means 15 is supported, and the middle part, which is thinner than the edge part. When the tuning fork 30 is formed in this manner and has no step-like portion, the problem can be prevented from occurring in that fatigue of the material of the tuning fork 30 begins at the step-like portion during vibration. Therefore, the durability of the tuning fork 30 can be kept good. Accordingly, the durability and reliability of the scanning microscope can be kept good.

The present invention also provides a scanning mechanism comprising:

i) a material supporting member on which a material to be scanned is supported, ii) an optical means which irradiates a light beam to said material to be scanned, and iii) a movement mechanism which moves said optical means with respect to said material supporting member such that said light beam scans said material to be scanned, wherein said movement mechanism for moving said optical means or said material supporting member is constituted of:

a) a tuning fork on which said optical means or said material supporting member is supported, and b) an excitation means for applying force, the magnitude of which changes periodically, to said tuning fork, and thereby causing said tuning fork to resonate.

BRIEF DESCRIPTION OF THE DRAWINGS

FIGS. 7 through 11 are plan views showing different examples of the tuning fork employed in the scanning microscope in accordance with the present invention, FIG. 12 is a plan view showing the major part of a fourth embodiment of the scanning microscope in accordance with the present invention.

DESCRIPTION OF THE PREFERRED EMBODIMENTS

The present invention will hereinbelow be described in further detail with reference to the accompanying drawings.

Figure 1:
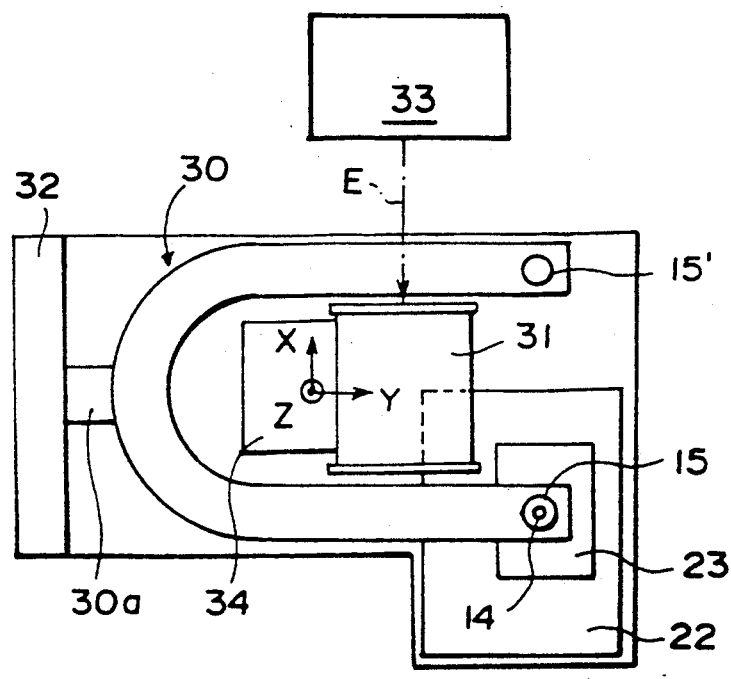
FIG. 1 is a plan view showing a light beam scanning mechanism, which is employed in a first embodiment of the scanning microscope in accordance with the present invention.
Figure 2:
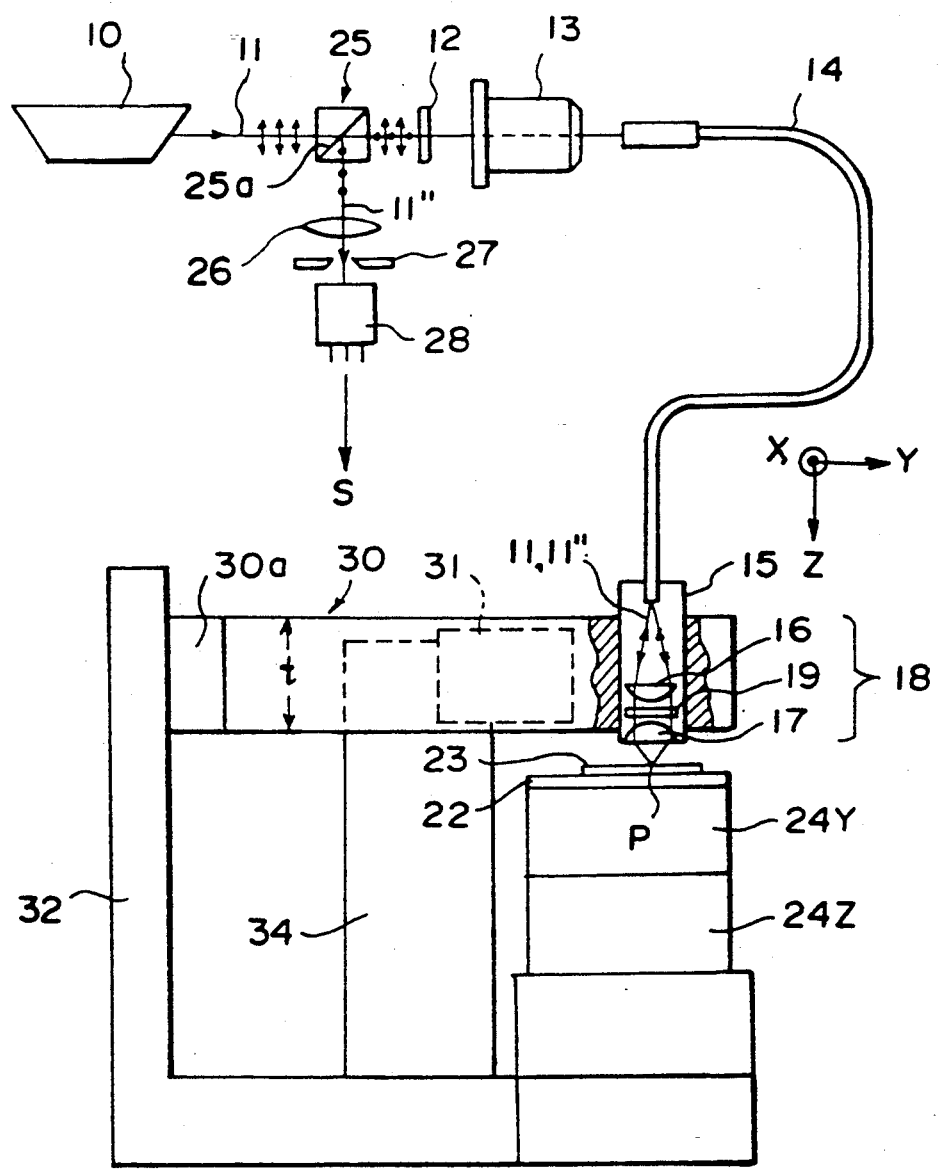
FIG. 2 is a partially cutaway front view showing the first embodiment of the scanning microscope in accordance with the present invention.

FIG. 2 shows a first embodiment of the scanning microscope in accordance with the present invention, which is a monochromatic reflection type of confocal scanning microscope. FIG. 1 is a plan view showing the scanning mechanism employed in this embodiment. As shown in FIG. 2, a monochromatic light laser 10 produces a laser beam 11 having a single wavelength. The linear polarized laser beam 11 impinges in the P-polarized condition upon a film surface 25a of a polarization beam splitter 25 and passes therethrough. The laser beam 11, which has passed through the polarization beam splitter 25, then passes through a halfwave plate 12 for adjusting the plane of polarization. The laser beam 11, which has passed through the halfwave plate 12, is condensed by an entry lens 13 and enters a polarization plane keeping optical fiber 14.

Figure 3:
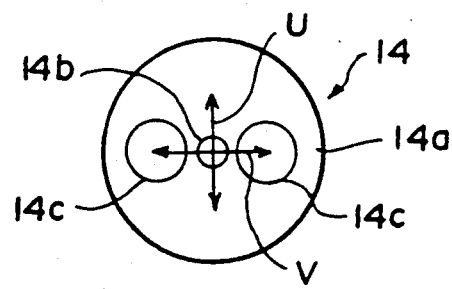
FIG. 3 is a sectional view showing a polarization plane keeping optical fiber, which is employed in the first embodiment of the scanning microscope in accordance with the present invention.

As the polarization plane keeping optical fiber 14, a PANDA type optical fiber may be employed. FIG. 3 shows the cross-sectional configuration of the PANDA type optical fiber 14. As illustrated in FIG. 3, the optical fiber 14 is composed of a cladding part 14a and a core 14b which is located in the cladding part 14a. Stress imparting parts 14c, 14c are formed on both sides of the core 14b. The halfwave plate 12 is rotated appropriately such that the orientation of the plane of polarization of the linear polarized laser beam 11 coincides with the directions indicated by the double headed arrow V in FIG. 3, along which the stress imparting parts 14c, 14c stand in a line, or the directions indicated by the double headed arrow U in FIG. 3, which directions are normal to the directions indicated by the double headed arrow V. (In this embodiment, the halfwave plate 12 is rotated appropriately such that the orientation of the plane of polarization of the linear polarized laser beam 11 coincides with the directions indicated by the double headed arrow U in FIG. 3. In this manner, the linear polarized laser beam 11 is caused to impinge upon the optical fiber 14.

One edge of the optical fiber 14 is secured to a probe 15. The laser beam 11, which has been guided through the optical fiber 14, is radiated out of said edge of the optical fiber 14. At this time, said edge of the optical fiber 14 radiates the laser beam 11 like a point light source. A light projecting optical means 18, which is composed of a collimator lens 16 and an objective lens 17, is secured to the probe 15. (The light projecting optical means 18 also serves as a light receiving optical means.) A quarter-wave plate 19 is located between the collimator lens 16 and the objective lens 17.

The laser beam 11, which has been radiated out of the aforesaid edge of the optical fiber 14, is collimated by the collimator lens 16. The collimated laser beam 11 then passes through the quarter-wave plate 19 and is converted thereby into a circularly polarized laser beam. The collimated laser beam 11 is then condensed by the objective lens 17, and an image of a small light spot of the condensed laser beam 11 is formed at the point P on a sample 23 (i.e. on the surface of the sample 23 or in the inside of the sample 23). The sample 23 is placed on a sample supporting member 22. The laser beam 11 is reflected by the sample 23. At this time, the direction of rotation of the circularly polarized laser beam 11 is reversed. The laser beam 11", which has thus been reflected by the sample 23, passes through the quarter-wave plate 19 and is converted thereby into a linear polarized laser beam 11" having the plane of polarization, which is oriented in the direction normal to the orientation of the plane of polarization of the laser beam 11. Thereafter, the laser beam 11" is condensed by the collimator lens 16 and impinges upon the polarization plane keeping optical fiber 14. At this time, the orientation of the plane of polarization of the laser beam 11" coincides with the directions indicated by the double headed arrow V in FIG. 3. The laser beam 11", which has been guided through the optical fiber 14, is radiated out of the edge of the optical fiber 14 and collimated by the entry lens 13.

Thereafter, the laser beam 11", which has thus been collimated by the entry lens 13, passes through the halfwave plate 12, impinges upon the film surface 25a of the polarization beam splitter 25 in the S-polarized condition, and is reflected by the film surface 25a. The laser beam 11", which has thus been reflected by the film surface 25a, is condensed by a condensing lens 26, passes through an aperture pinhole 27, and is detected by a photodetector 28. The photodetector 28 is constituted of a photomultiplier, or the like, and generates a signal S representing the brightness of the region of the sample 23 which was exposed to the laser beam.

As described above, a light isolator is provided which is composed of the quarter-wave plate 19 and the polarization beam splitter 25. Therefore, the laser beam 11" does not return to the laser 10, and a large amount of the laser beam 11" can be guided to the photodetector 28. Also, the laser beam 11, which is reflected by the entry lens 13, the edge surface of the optical fiber 14, or the like, is prevented from impinging upon the photodetector 28. Therefore, a signal S having a high S/N ratio can be obtained.

How the sample 23 is two-dimensionally scanned with the light spot of the laser beam 11, which is formed at the point P, will be described hereinbelow with reference to FIG. 1. The probe 15 is secured to one edge part of a tuning fork 30, which is constituted of iron and placed horizontally, such that the optical axis of the optical means 18 extends vertically. A base part 30a of the tuning fork 30 is secured to a frame 32, and the tuning fork 30 can vibrate at a predetermined intrinsic frequency (as will be described later). An electromagnet 31 is located inside of the space defined by the tuning fork 30 in a slightly spaced relation to both edge parts of the tuning fork 30. The electromagnet 31 is secured to a support 34, which is in turn secured to the frame 32.

A driving circuit 33 applies a square-pulsed current E having a frequency, which is equal to the intrinsic frequency of the tuning fork 30, to the electromagnet 31. In this manner, a magnetic field is intermittently applied to both edge parts of the tuning fork 30. Therefore, the tuning fork 30 vibrates at its intrinsic frequency. As a result, the probe 15 secured to the tuning fork 30 is reciprocally moved at high speeds in the directions indicated by the arrow X in FIGS. 1 and 2 (i.e. horizontally). In this manner, the sample 23 is scanned with the light spot in the main scanning directions.

A Z movable stage 24Z, which is capable of reciprocally moving in the directions indicated by the arrow Z (i.e. along the optical axis of the optical means 18), is located on the frame 32. Also, a Y movable stage 24Y, which is capable of reciprocally moving in the directions indicated by the arrow Y (which directions are normal to the directions indicated by the arrows X and Z), is located on the Z movable stage 24Z. The sample supporting member 22 is mounted on the Y movable stage 24Y. When the main scanning with the light spot formed at the point P is carried out in the manner described above, the Y movable stage 24Y is moved reciprocally. In this manner, the sub-scanning with the light spot formed at the point P can be effected.

Each time the two-dimensional scanning with the light spot formed at the point P is carried out, the Z movable stage 24Z is moved appropriately. In this manner, even if small protrusions or recesses are present on the surface of the sample 23, a signal S can be obtained which represent the image information at every focusing plane within the range of movement of the sample 23 along the directions indicated by the arrow Z.

As described above, with the aforesaid embodiment, the tuning fork 30 is caused to resonate, and the main scanning with the light spot of the laser beam 11, which is formed at the point P, is carried out by utilizing the large amplitude of vibration of the tuning fork 30. Therefore, the width, over which the laser beam 11 scans the sample 23 in the main scanning direction, can be kept large, and an image of a large area of the sample 23 can be formed. In this embodiment, as illustrated in FIG. 1, a dummy probe 15' having the same configuration as the probe 15 is secured to the other edge part of the tuning fork 30. In this manner, the mechanical balance between both edge parts of the tuning fork 30 can be kept good, and an approximately ideal resonant system can be obtained.

Also, in the aforesaid embodiment, the electromagnet 31 is located inside of the space defined by the tuning fork 30 in order to apply a magnetic field to both edge parts of the tuning fork 30. Therefore, the magnetic flux density applied to the tuning fork 30, i.e. the force applied thereto, can be kept larger than when an electromagnet is located on the side outward from one edge part of the tuning fork 30.

An electric configuration for the aforesaid embodiment will be described hereinbelow with reference to FIG. 4. The signal S, which has been generated by the photodetector 28, is amplified by an amplifier 40. The amplified signal S is then fed into an A/D converter 41 and is converted thereby into a digital image signal Sd. The image signal Sd is fed into an image processing unit 42, which carries out image processing, such as gradation processing, on the image signal Sd. The image signal, which has been obtained from the image processing, is fed into an image reproducing apparatus 43, which may be constituted of a CRT display device, or the like. The image reproducing apparatus 43 reproduces an image, which is represented by the image signal Sd, i.e. a microscope image of the sample 23.

The image reproducing apparatus 43 is connected to a computer 44, which may be a small business computer, or the like. Instructions for carrying out image processing, basic operations of the scanning microscope, formation of an image to be used in finding the field of view, formation of an image to be ultimately reproduced as a visible image, or the like, are entered from an input means, such as a keyboard, of the computer 44.

The Y movable stage 24Y is reciprocally moved at a predetermined frequency by a driver 46. The driver 46 receives a signal having the predetermined frequency from an oscillator 45. A signal is generated by the image processing unit 42 and is then converted by a D/A converter 47 into a Z axis control signal Fs. The Z movable stage 24Z is operated by a driver 48 in accordance with the Z axis control signal Fs such that it may be brought into a predetermined Z position. The oscillator 45 and the D/A converter 47 are respectively controlled by a vertical synchronizing signal Vs and the focusing direction signal Fs. In this manner, the movements of the stages 24Y and 24Z are synchronized.

The electromagnet driving circuit 33 is constituted of a pulse generator 49 and a driver 50. The driver 50 is constituted of an open collector buffer 51, a photocoupler 52, a power MOS-FET 53, a diode 54, and a capacitor 55. The driver 50 receives a frequency signal Sf from the pulse generator 49 and applies a square-pulsed current E, which has the same frequency as the frequency signal Sf, to the electromagnet 31. The pulse generator 49 is controlled by a horizontal synchronizing signal Hs, which is generated by the image processing unit 42. In this manner, the reciprocal movement of the probe 15 is synchronized with the movements of the stages 24Y and 24Z.

The frequency of the signal Sf generated by the pulse generator 49 is selectively switched to the frequency f1 of the first overtone or the frequency f3 of the third overtone of the tuning fork 30 in accordance with a frequency change-over signal Cf. Specifically, when an instruction for carrying out the formation of an image to be used in finding the field of view is given to the computer 44, the frequency of the signal Sf is set to the frequency f1 of the first overtone of the tuning fork 30. When an instruction for carrying out the formation of an image to be ultimately reproduced as a visible image is given to the computer 44, the frequency of the signal Sf is set to the frequency f3 of the third overtone of the tuning fork 30.

In the manner described above, when the field of view is to be found, even if the main scanning with the laser beam is carried out at a comparatively low frequency (e.g. several hundreds of hertz), the amplitude of the probe 15, i.e. the width, over which the laser beam scans the sample in the main scanning direction, can be kept sufficiently large (e.g. at several hundreds of microns). Therefore, a microscope image of a large area of the sample 23 can be reproduced by the image reproducing apparatus 43, and the field of view can be easily found from the microscope image.

When an image to be ultimately reproduced as a visible image is formed, the amplitude of the probe 15, i.e. the width, over which the laser beam scans the sample in the main scanning direction, becomes comparatively small (e.g. several tens of microns). However, the frequency of the main scanning with the laser beam can be kept 6.75 times the main scanning frequency obtained when the field of view is to be found. In this manner, the scanning can be carried out quickly, and therefore the time required for an image to be formed can be kept short. In general, the ratio of the amplitude of vibration of the tuning fork 30 at the frequency f1 of the first overtone to the amplitude of vibration of the tuning fork 30 at the frequency f3 of the third overtone falls within the range of 10:1 to 100:1.

A second embodiment of the scanning microscope in accordance with the present invention will be described hereinbelow with reference to FIG. 5. The second embodiment is the same as the first embodiment, except for the electric configuration for operating the electromagnet 31. In FIG. 5, similar elements are numbered with the same reference numerals with respect to FIG. 4.

In the second embodiment, a current control signal C is fed from the computer 44 into the pulse generator 49. The duty ratio of the square-pulsed current E is changed in accordance with the current control signal C. Specifically, when the magnification designated to the computer system 44 is low and the area of the field of view is large, the duty ratio is set to a large value, and the mean value of the current I fed to the electromagnet 31 is thereby adjusted to be large. When the mean value of the current I fed to the electromagnet 31 is large, the density of the magnetic flux applied from the electromagnet 31 to the tuning fork 30, i.e. the force applied to the tuning fork 30, becomes high, and therefore the amplitude of the tuning fork 30 becomes large. Accordingly, the width, over which the probe 15 moves reciprocally, i.e. the width, over which the laser beam scans the sample in the main scanning direction, is kept large.

The current control signal C is also fed into the sub-scanning oscillator 45. The frequency, the current value, or the duty ratio of the driving pulse F fed to the Y movable stage 24Y is changed in the same manner as that described above in accordance with the current control signal C. In this manner, the width, over which the Y movable stage 24Y moves reciprocally, i.e. the width, over which the laser beam scans the sample in the sub-scanning direction, is adjusted to be large.

When the widths, over which the laser beam scans the sample in the main scanning direction and in the sub-scanning direction, are adjusted to be large in the manner described above, the area of the field of view becomes large, and a sample image is formed at a low magnification. Conversely, when the widths, over which the laser beam scans the sample in the main scanning direction and in the sub-scanning direction, are adjusted to be small, the area of the field of view becomes small, and a sample image is formed at a high magnification.

In this embodiment, the mean value of the current I, which has been fed into the electromagnet 31, is detected by a current detection coil 61 and an amplifier 62. Information representing the detected current value is fed into the computer system 44. In accordance with the difference between the detected current value and the target current value corresponding to the designated magnification, the computer system 44 changes the current control signal C such that the mean current value I becomes equal to the target current value.

Instead of the duty ratio of the square-pulsed current E being changed in accordance with the current control signal C, the value of the current fed into the electromagnet 31 may be altered by changing the value of the voltage applied to the electromagnet 31.

Also, the tuning fork 30 should preferably be vibrated at the frequency of its first overtone. In such cases, the maximum amplitude of the tuning fork 30 becomes larger, and therefore the area of the field of view and the magnification change width (i.e. the enlargement ratio or the reduction ratio) of the reproduced image can be kept larger than when the tuning fork 30 is vibrated at a different frequency, e.g. at the frequency of the third overtone of the tuning fork 30.

In the manner described above, the width, over which the laser beam scans the sample in the main scanning direction, can be changed within the range of, for example, the minimum of 10 μm to the maximum of 200 μm or 400 μm. When the width, over which the laser beam scans the sample in the sub-scanning direction, is also changed in accordance with the width, over which the laser beam scans the sample in the main scanning direction, the ratio of the minimum magnification to the maximum magnification of the reproduced image falls within the range of 1:20 to 1:40.

A third embodiment of the scanning microscope in accordance with the present invention will be described hereinbelow with reference to FIG. 6. The third embodiment is characterized by the shape of the tuning fork 30. The electric configuration for this embodiment may be identical with that employed in the first or second embodiment. Alternatively, any of other electric configurations may be employed.

Figure 6:
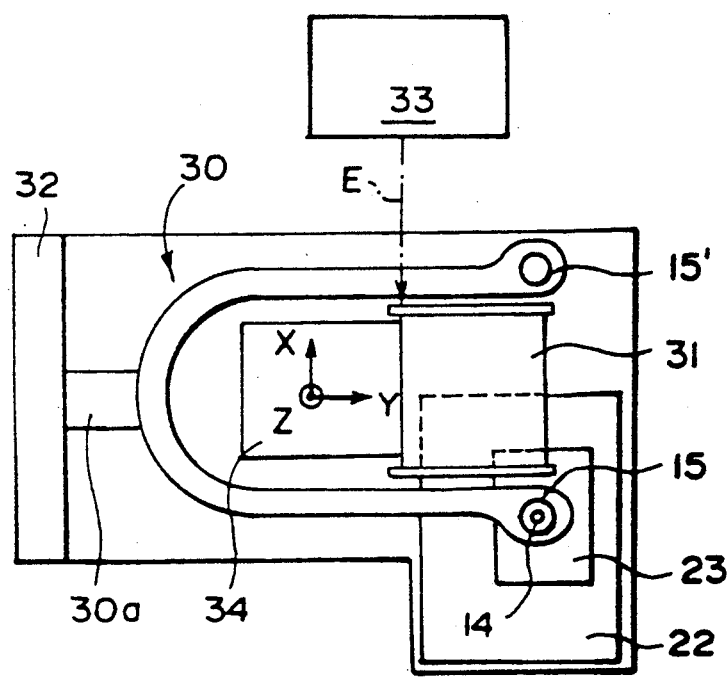
FIG. 6 is a plan view showing a light beam scanning mechanism, which is employed in a third embodiment of the scanning microscope in accordance with the present invention.
Figure 7:
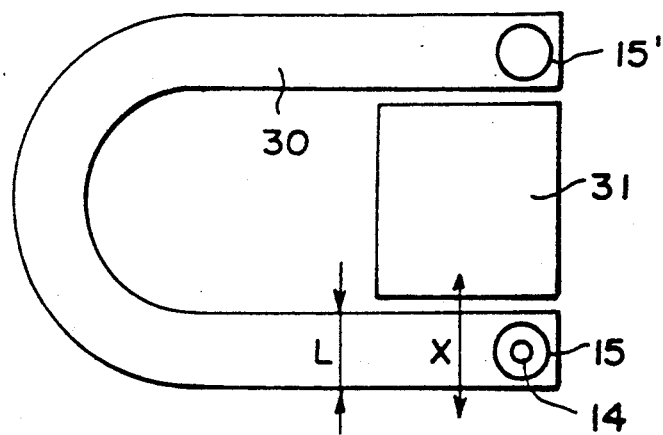

As illustrated in FIG. 6, the tuning fork 30 in this embodiment is shaped such that the middle part is thinner than the edge part, at which the probe 15 is supported. In such cases, as described above in detail, the amplitude of the tuning fork 30 can be kept larger than when the tuning fork 30 is shaped such that the width of the middle part is the same as the width of the edge part, at which the probe 15 is supported.

Figure 8:
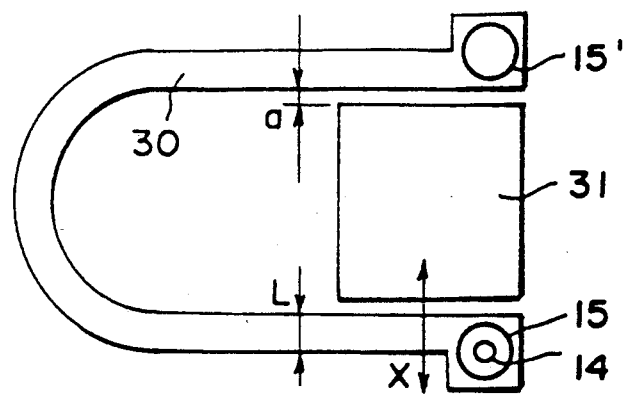
Figure 9:
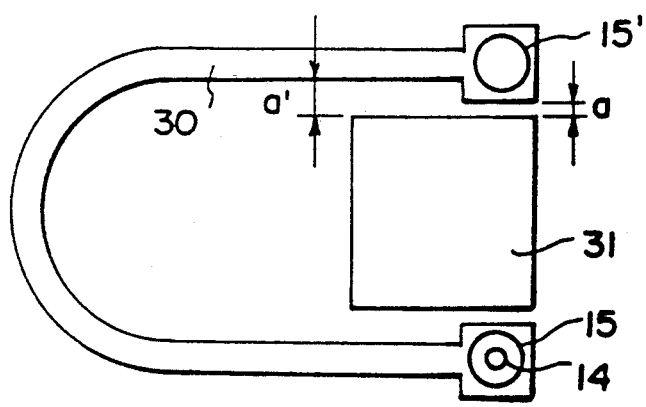

In this embodiment, the width of the tuning fork 30 is changed smoothly in the region between the edge part, at which the probe 15 is supported, and the middle part, which is thinner than the edge part. When the tuning fork 30 is formed in this manner and has no step-like portion as shown in FIG. 8 or FIG. 9, the problem can be prevented from occurring in that fatigue of the material of the tuning fork 30 begins at the step-like portion during vibration. Therefore, the durability of the tuning fork 30 can be kept good.

Figure 10:
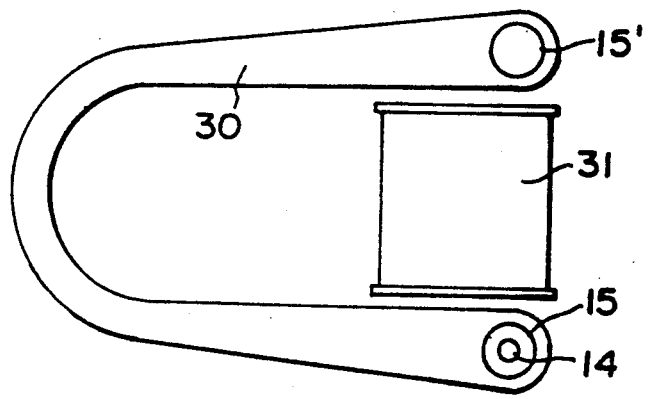

The amplitude of vibration of the tuning fork 30 is also inversely proportional to the height, t, of the tuning fork 30, which height is shown in FIG. 2. Therefore, the height, t, of the tuning fork 30 should preferably be set to as small a value as possible, with which the tuning fork 30 can reliably support the probe 15. Instead of the tuning fork 30 being shaped as shown in FIG. 6, the tuning fork 30 may be shaped as illustrated in FIG. 8, FIG. 9, FIG. 10, or FIG. 11. As described above, from the point of view of keeping the amplitude large, the tuning fork 30 having the shape shown in FIG. 8 is advantageous over that shown in FIG. 9. The tuning fork 30 shown in FIG. 6 or FIG. 10 is advantageous over that shown in FIG. 11.

A fourth embodiment of the scanning microscope in accordance with the present invention will be described hereinbelow with reference to FIG. 12. In this embodiment, permanent magnets 65A and 65B are secured to the outer side faces of both edge parts of the tuning fork 30. Electromagnets 31A and 31B are located on the sides outward from the permanent magnets 65A and 65B in close relation thereto. The permanent magnets 65A and 65B are located such that the same magnetic pole (e.g. the N magnetic pole) faces the electromagnets 31A and 31B. The electromagnet driving circuit 33 operates the electromagnets 31A and 31B such that magnetic fields, the directions of which change periodically, may be applied from the electromagnets 31A and 31B to the permanent magnets 65A and 65B, and the direction of the magnetic field applied by the electromagnet 31A and the direction of the magnetic field applied by the electromagnet 31B are opposite to each other.

In this embodiment, at the instant at which the side of the electromagnet 31A facing the permanent magnet 65A constitutes the N magnetic pole and repulses the corresponding edge part of the tuning fork 30, the side of the electromagnet 31B facing the permanent magnet 65B also constitutes the N magnetic pole and repulses the corresponding edge part of the tuning fork 30. Then, when the directions of the magnetic fields are changed and the side of the electromagnet 31A facing the permanent magnet 65A constitutes the S magnetic pole and attracts the corresponding edge part of the tuning fork 30, the side of the electromagnet 31B facing the permanent magnet 65B also constitutes the S magnetic pole and attracts the corresponding edge part of the tuning fork 30. In this manner, the tuning fork 30 is caused to resonate. Therefore, the probe 15 reciprocally moves at a high speed, and the sample is scanned with the laser beam in the main scanning direction. In such cases, the force for resonating the tuning fork 30 can be adjusted to be larger than in the first, second, and third embodiments. Therefore, even if the probe 15 is comparatively heavy, it can be reciprocally moved at a high speed.

In this embodiment, the distance between both edge parts of the tuning fork 30 is markedly small. The tuning fork 30 having such a shape is advantageous in that it can easily resonate with the force received from the excitation means. However, the shape of the tuning fork 30 is not limited to the one shown in FIG. 12, and may be modified in various manners.

Figure 13:
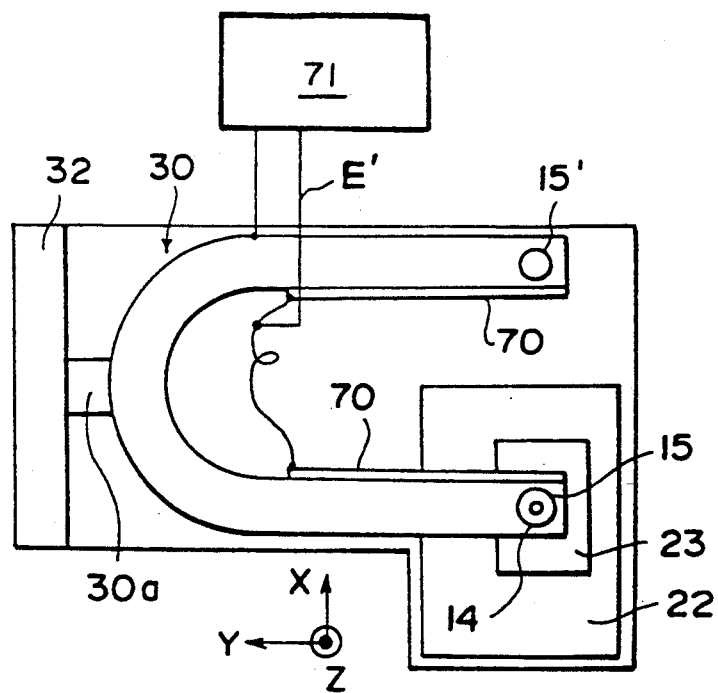
FIG. 13 is a plan view showing a light beam scanning mechanism, which is employed in a fifth embodiment of the scanning microscope in accordance with the present invention.
Figure 14:
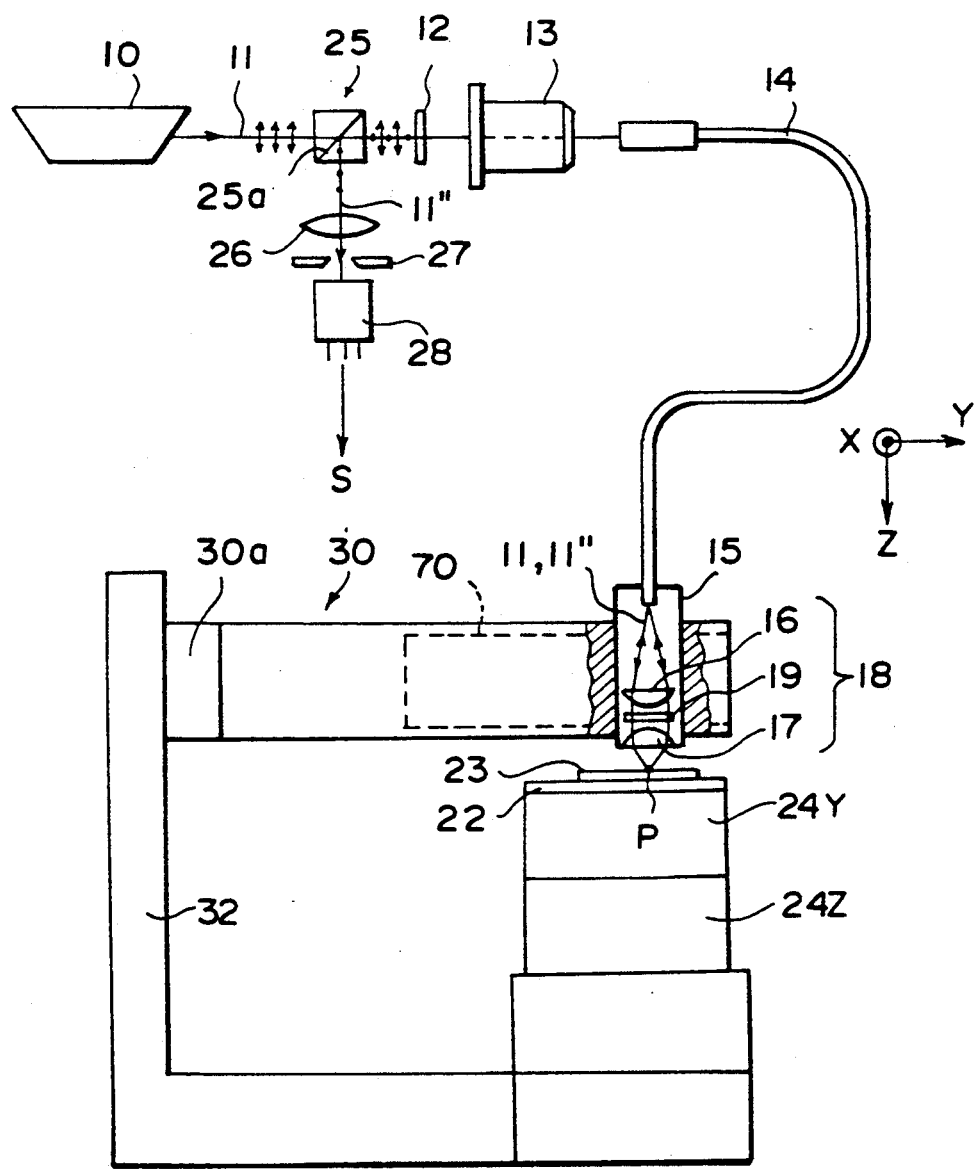
FIG. 14 is a partially cutaway front view showing the fifth embodiment of the scanning microscope in accordance with the present invention.

A fifth embodiment of the scanning microscope in accordance with the present invention will be described hereinbelow with reference to FIGS. 13 and 14. This embodiment is different from those described above in the excitation means for resonating the tuning fork 30. Configurations other than the excitation means may be the same as those in the aforesaid embodiments.

In the fifth embodiment, the tuning fork 30 is constituted of an aluminum alloy A5056, and piezo-electric devices 70, 70 are adhered to parts close to both edges of the tuning fork 30. A square-pulsed voltage E' having a high frequency is applied from a piezo-electric device driving circuit 71 to the piezo-electric devices 70, 70 in order to strain the piezo-electric devices 70, 70 periodically. Therefore, the edge parts of the tuning fork 30 resonate in the directions indicated by the arrow X. As a result, the probe 15 supported at one edge part of the tuning fork 30 reciprocally moves in the directions indicated by the arrow X, and the sample is scanned with the laser beam in the main scanning direction.

In this embodiment, during vibration, the tuning fork 30 does not strike against the excitation means for resonating the tuning fork 30. Therefore, the width, over which the probe 15 moves with respect to the sample supporting member 22, i.e. the width, over which the laser beam scans the sample in the main scanning direction, can be kept large. Also, in this embodiment, the material of the tuning fork 30 is not limited to a magnetic material, but may be selected from those which can vibrate easily with a large amplitude. Therefore, also for this reason, the width, over which the laser beam scans the sample in the main scanning direction, can be kept large.

The piezo-electric device driving circuit 71 will hereinbelow be described with reference to FIG. 15. The piezo-electric device driving circuit 71 is constituted of the pulse generator 49 and a driver 72. The driver 72 is constituted of the open collector buffer 51, the photocoupler 52, the power MOS-FET 53, a charging resistor 73, and a discharging resistor 74. The driver 72 applies the square-pulsed voltage E' having the same frequency as the frequency signal Sf, which is received from the pulse generator 49, to the piezo-electric devices 70, 70.

Figure 4:
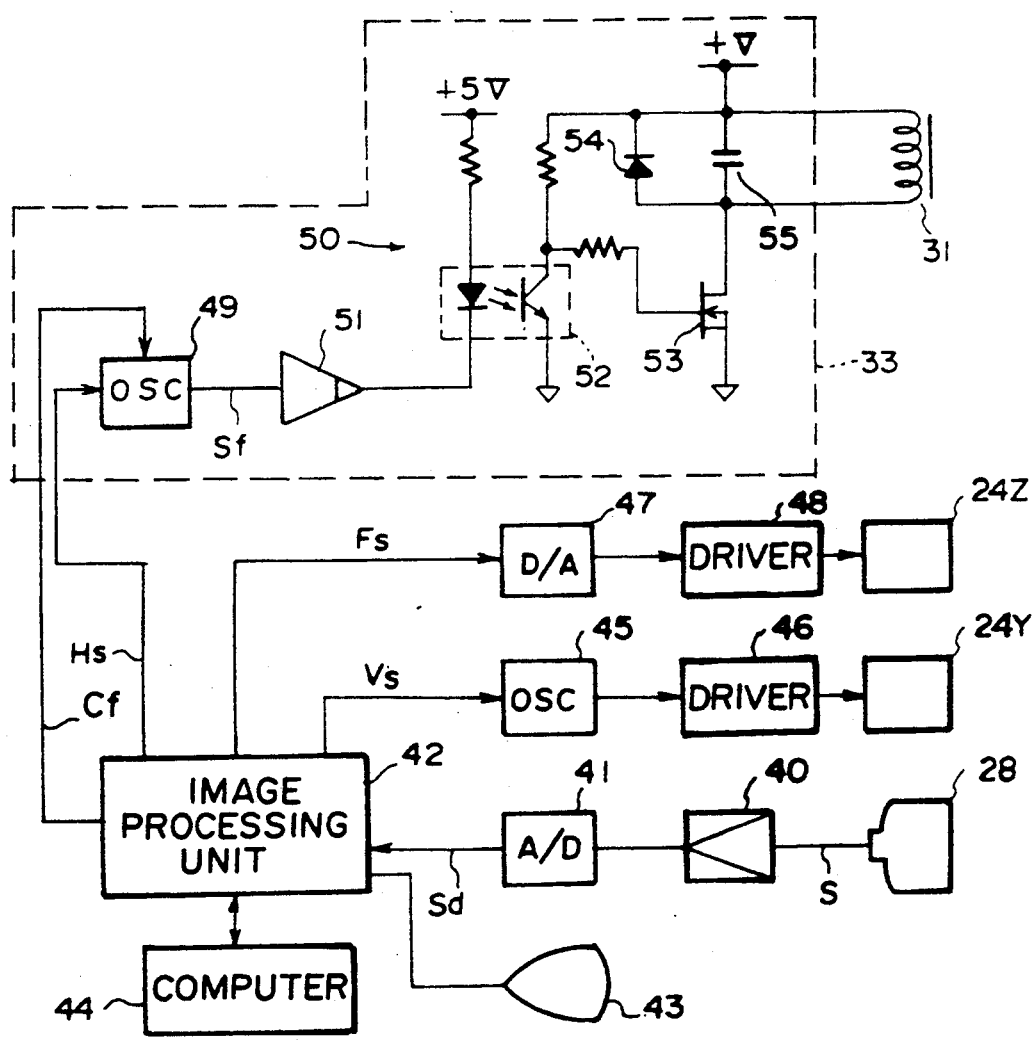
FIG. 4 is a diagram showing an electric circuit of the first embodiment of the scanning microscope in accordance with the present invention.
Figure 5:
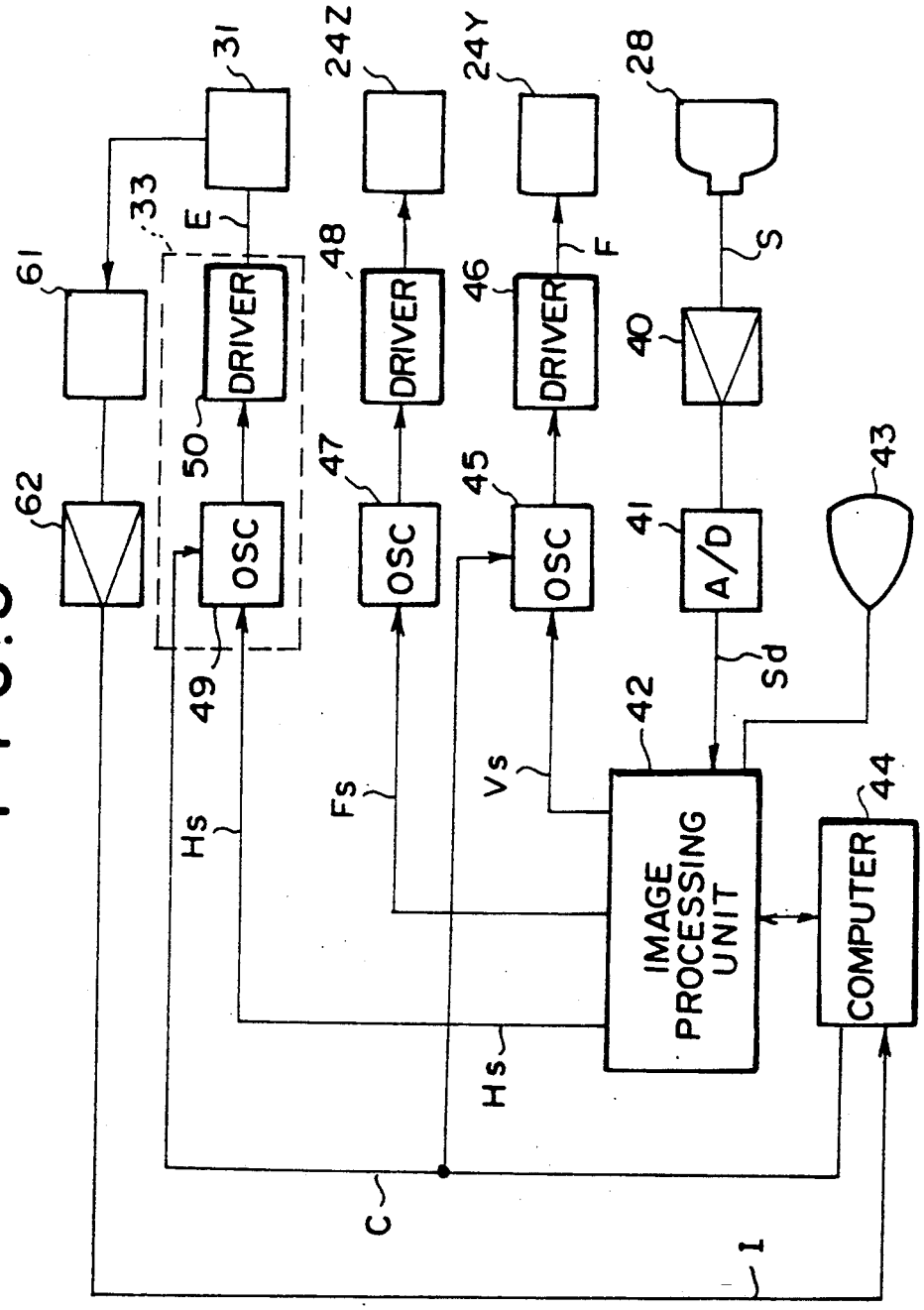
FIG. 5 is a diagram showing an electric circuit of a second embodiment of the scanning microscope in accordance with the present invention.

In this embodiment, the electric configuration connected to the piezo-electric device driving circuit 71 is basically the same as the electric configuration connected to the electromagnet driving circuit 33 shown in FIG. 4. Specifically, the frequency of the signal Sf generated by the pulse generator 49 is selectively switched to the frequency f1 of the first overtone or the frequency f3 of the third overtone of the tuning fork 30 in accordance with the frequency change-over signal Cf. When an image to be used in finding the field of view is formed, the frequency of the signal Sf is set to the frequency f1 of the first overtone of the tuning fork 30. When an image to be ultimately reproduced as a visible image is formed, the frequency of the signal Sf is set to the frequency f3 of the third overtone of the tuning fork 30. In this manner, as in the first embodiment described above, when the field of view is to be found, a microscope image of a large area of the sample 23 can be obtained. When an image to be ultimately reproduced as a visible image is formed, the scanning can be carried out quickly.

In this embodiment, the piezo-electric devices 70, 70 are adhered to the inner faces of the tuning fork 30. Alternatively, as in a sixth embodiment of FIG. 16, the piezo-electric devices 70, 70 may be adhered to the outer faces of the tuning fork 30. Also, in cases where the piezo-electric devices 70, 70 are utilized as the excitation means, the shape of the tuning fork 30 may be selected from various shapes described above.

Figure 15:
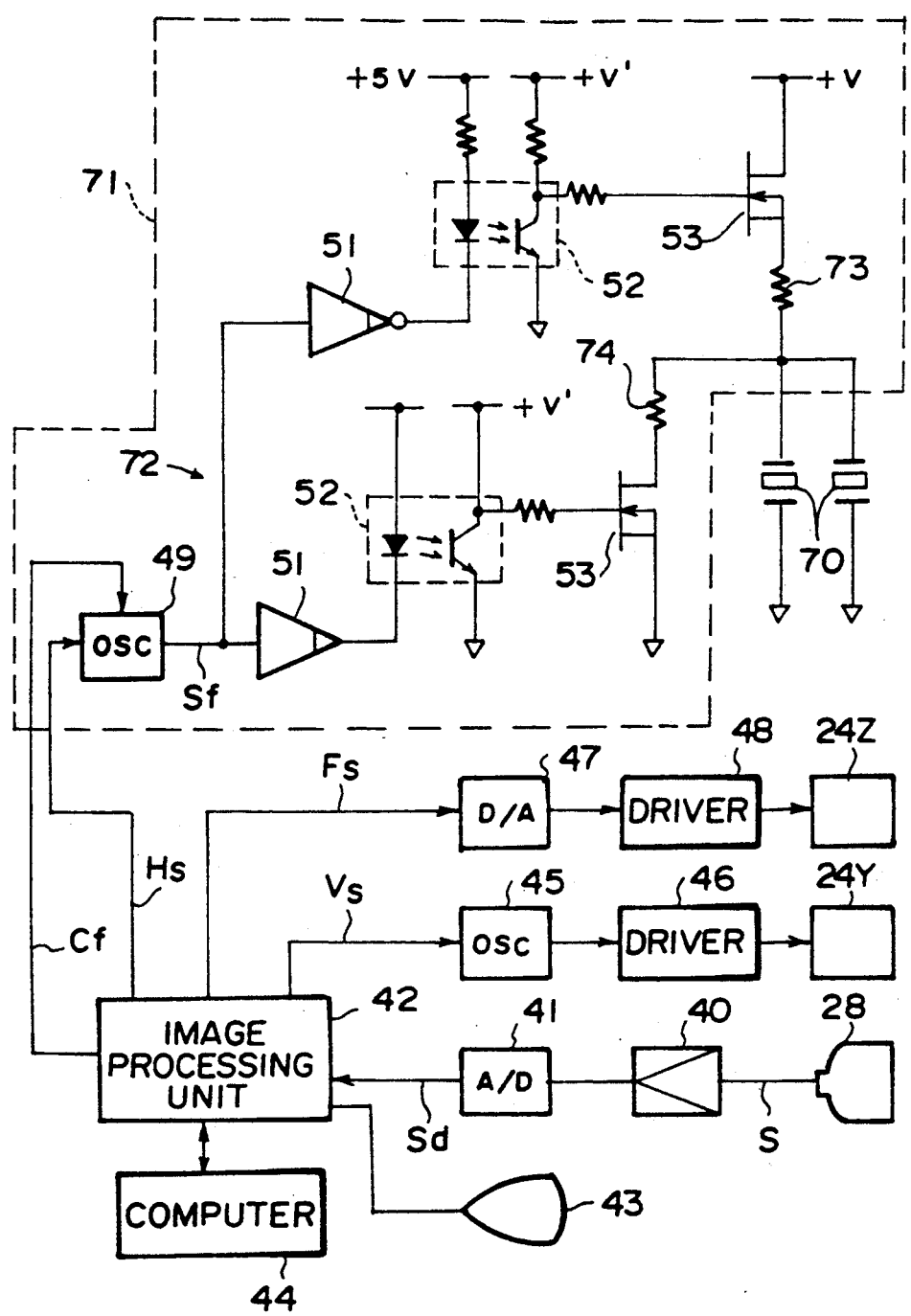
FIG. 15 is a diagram showing an electric circuit of the fifth embodiment of the scanning microscope in accordance with the present invention.
Figure 16:
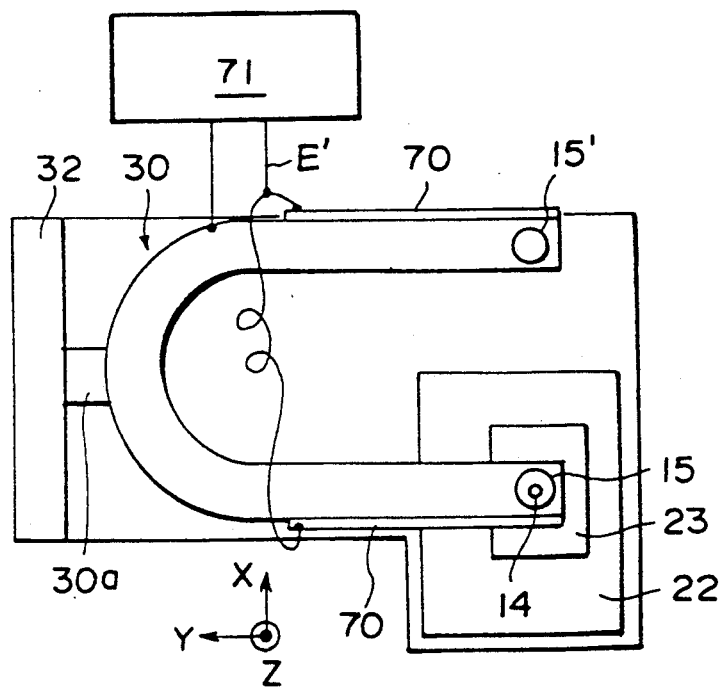
FIG. 16 is a plan view showing a light beam scanning mechanism, which is employed in a sixth embodiment of the scanning microscope in accordance with the present invention.

In the sixth embodiment of FIG. 16, the piezo-electric device driving circuit 71 may basically the same as the piezo-electric device driving circuit 71 shown in FIG. 15. In cases where the electric configuration connected to the piezo-electric device driving circuit 71 is the same as the electric configuration connected to the piezo-electric device driving circuit 71 shown in FIG. 15, the same effects as those with the first and fifth embodiments can be obtained. In cases where the electric configuration connected to the piezo-electric device driving circuit 71 is the same as the electric configuration connected to the electromagnet driving circuit 33 shown in FIG. 5, the magnification of the reproduced image can be changed continuously over a wide range as with the second embodiment.

Figure 17:
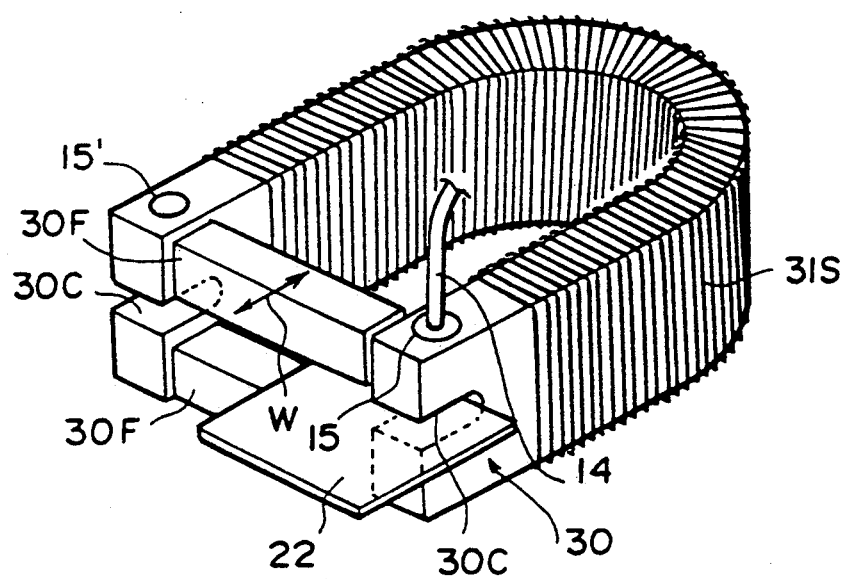
FIG. 17 is a perspective view showing a light beam scanning mechanism, which is employed in a seventh embodiment of the scanning microscope in accordance with the present invention.

A seventh embodiment of the scanning microscope in accordance with the present invention will be described hereinbelow with reference to FIG. 17. In this embodiment, the tuning fork 30 is constituted of steel, which is one of magnetic materials. An exciting coil 31S is wound around the tuning fork 30. An electromagnet is constituted of the exciting coil 31S and the tuning fork 30. When the electromagnet thus constituted is operated in the same manner as that for the aforesaid electromagnet 31, which is independent of and separate from the tuning fork 30, the edge parts of the tuning fork 30 vibrate. Therefore, the probe 15 can be reciprocally moved at a high speed.

In this embodiment, recesses 30C, 30C having the same shape are formed at the edge parts of the tuning fork 30. The sample supporting member 22 is located in the recess 30C formed at the edge part, at which the probe 15 is supported. Two iron cores 30F, 30F for a magnetic circuit are located between both edge parts of the tuning fork 30. The iron cores 30F, 30F are located at positions higher and lower than the recesses 30C, 30C such that the iron cores 30F, 30F may not interfere with the sample supporting member 22. The iron cores 30F, 30F can efficiently apply a strong magnetic field to the tuning fork 30. However, the iron cores 30F, 30F may be omitted such that a large amplitude of the tuning fork 30 may be obtained by eliminating the interference between the iron cores 30F, 30F and the vibrating tuning fork 30.

When the iron cores 30F, 30F are moved in the directions indicated by the double headed arrows W, the strength of the magnetic field applied to the tuning fork 30 changes, and the amplitude of vibration of the tuning fork 30 is thereby changed. In this manner, the width, over which the laser beam scans the sample, can be adjusted. In cases where an iron core around which a coil has been wound is utilized in lieu of the iron cores 30F, 30F, current flows through the coil as the tuning fork 30 vibrates. The value of the current changes in accordance with the amplitude of the tuning fork 30. Therefore, the coil can be utilized as a sensor for detecting the amplitude of the tuning fork 30.

Figure 18:
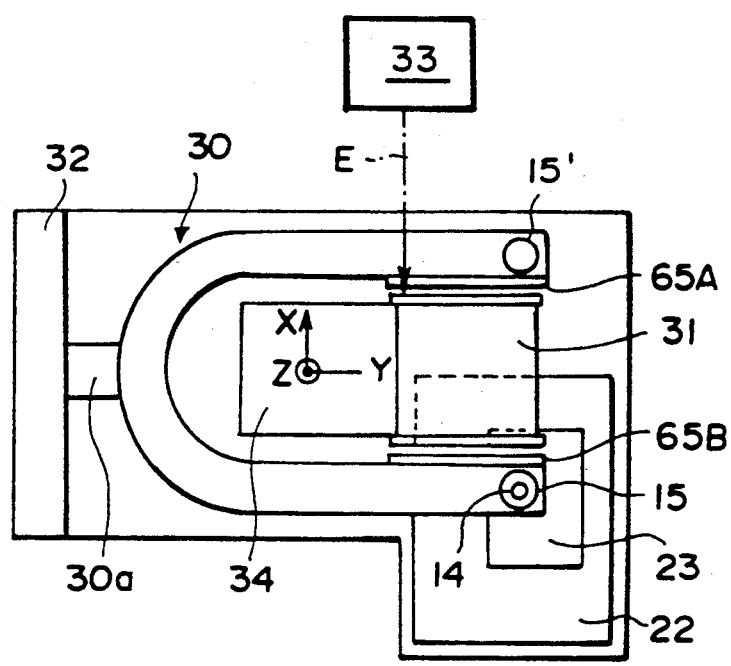
FIG. 18 is a plan view showing a light beam scanning mechanism, which is employed in an eighth embodiment of the scanning microscope in accordance with the present invention.

An eighth embodiment of the scanning microscope in accordance with the present invention will be described hereinbelow with reference to FIG. 18. In this embodiment, the tuning fork 30 is constituted of an aluminum alloy A5056, which is one of non-magnetic materials. As described above, the modulus of elasticity E of the aluminum alloy A5056 is markedly smaller than the modulus of elasticity of a magnetic material, such as SS41. The permanent magnets 65A and 65B are secured to inner faces of the two edge parts of the tuning fork 30. The permanent magnets 65A and 65B are located such that the N magnetic pole of one of the permanent magnets 65A and 65B may face inwardly, and the S magnetic pole of the other permanent magnet may face inwardly. The base part 30a of the tuning fork 30 is secured to the frame 32, and the tuning fork 30 can vibrate at a predetermined intrinsic frequency. The electromagnet 31 is located inside of the space defined by the tuning fork 30 in a slightly spaced relation to the permanent magnets 65A and 65B. The electromagnet 31 is secured to the support 34, which is in turn secured to the frame 32.

The electromagnet driving circuit 33, which constitutes an excitation means together with the electromagnet 31, applies a square-pulsed current E having a frequency, which is equal to the intrinsic frequency of the tuning fork 30, to the electromagnet 31. In this manner, a magnetic field is intermittently applied to the permanent magnets 65A and 65B located at both edge parts of the tuning fork 30. In this manner, both the permanent magnets 65A and 65B are attracted toward the electromagnet 31 and are then released. Such operations are repeated. Therefore, the tuning fork 30 resonates at its intrinsic frequency. As a result, the probe 15 secured to the tuning fork 30 is reciprocally moved at high speeds in the directions indicated by the arrow X (i.e. horizontally). In this manner, the sample 23 is scanned with the light spot in the main scanning directions.

In this embodiment, the electromagnet 31 is located inside of the space defined by the tuning fork 30 in order to apply a magnetic field to the permanent magnets 65A and 65B. Therefore, the force applied to the tuning fork 30 can be kept larger than when a permanent magnet is secured to the outer face of one edge part of the tuning fork 30 and an electromagnet is located on the side outward from the permanent magnet.

In the aforesaid embodiments, the scanning microscope in accordance with the present invention is constituted as a monochromatic reflection type. The scanning microscope in accordance with the present invention is also applicable to scanning microscopes for forming color images, transmission types of scanning microscopes, scanning fluorescence microscopes, or the like. Also, in the aforesaid embodiments, the optical means is moved reciprocally. The scanning microscope in accordance with the present invention is also applicable when the sample supporting member is moved reciprocally.

Also, the scanning mechanisms employed in the aforesaid embodiments of the scanning microscope in accordance with the present invention are also applicable when the scanning is to be carried out in apparatuses other than microscopes. For example, the scanning mechanisms described above may be employed when the scanning is to be carried out during the writing of information in memories, the reading of information from memories, and the detection of video or audio signals from recording media.

What is claimed is:

1. A scanning microscope comprising:
   i) a sample supporting member on which a sample is supported,
   ii) an optical means which focuses a light beam as a light spot on said sample,
   iii) a movement mechanism which moves said optical means with respect to said sample supporting member such that said light spot scans said sample, and
   iv) a means for photoelectrically detecting light radiated out of the portion of said sample, which is exposed to said light spot, an image of said sample being thereby formed,
   wherein said movement mechanism for moving said optical means or said sample supporting member is constituted of:
   a) a tuning fork on which said optical means or said sample supporting member is supported, and
   b) an excitation means for applying force, the magnitude of which changes periodically, to said tuning fork, and thereby causing said tuning fork to resonate such that a resonating frequency of said tuning fork is varied depending upon the width and length of said tuning fork, said tuning fork being constituted of a magnetic material,
   wherein said excitation means is composed of an electromagnet for applying a magnetic field, the strength of which changes periodically, to said tuning fork, and a driving circuit for operating said electromagnet, and
   wherein said driving circuit selectively feeds a driving current, the magnitude of which can be adjusted for scanning said sample at the frequency of the first overtone of said tuning fork, or a driving current, the magnitude of which can be adjusted for scanning said sample at the frequency of the third overtone of said tuning fork, to said electromagnet.

2. A scanning microscope comprising:
   i) a sample supporting member on which a sample is supported,
   ii) an optical means which focuses a light beam as a light spot on said sample,
   iii) a movement mechanism which moves said optical means with respect to said sample supporting member such that said light spot scans said sample, and
   iv) a means for photoelectrically detecting light radiated out of the portion of said sample, which is exposed to said light spot, an image of said sample being thereby formed,
   wherein said movement mechanism for moving said optical means or said sample supporting member is constituted of:
   a) a tuning fork on which said optical means or said sample supporting member is supported, and
   b) an excitation means for applying force, the magnitude of which changes periodically, to said tuning fork, and thereby causing said tuning fork to resonate such that a resonating frequency of said tuning fork is varied depending upon the width and length of said tuning fork, said tuning fork being constituted of a magnetic material, and
   wherein said excitation means is composed of an electromagnet for applying a magnetic field, the strength of which changes periodically, to said tuning fork, and a driving circuit for operating said electromagnet, and
   wherein said electromagnet is formed by winding an exciting coil around said tuning fork, and wherein said driving circuit selectively feeds a driving current, the magnitude of which can be adjusted for scanning said sample at the frequency of the first overtone of said tuning fork, or a driving current, the magnitude of which can be adjusted for scanning said sample at the frequency of the third overtone of said tuning fork, to said electromagnet.

3. A scanning microscope comprising:
i) a sample supporting member on which a sample is supported,
ii) an optical means which focuses a light beam as a light spot on said sample,
iii) a movement mechanism which moves said optical means with respect to said sample supporting member such that said light spot scans said sample, and
iv) a means for photoelectrically detecting light radiated out of the portion of said sample, which is exposed to said light spot, an image of said sample being thereby formed,
wherein said movement mechanism for moving said optical means or said sample supporting member is constituted of:
a) a tuning fork on which said optical means or said sample supporting member is supported, and
b) an excitation means for applying force, the magnitude of which changes periodically, to said tuning fork, and thereby causing said tuning fork to resonate such that a resonating frequency of said tuning fork is varied depending upon the width and length of said tuning fork,
wherein said tuning fork being constituted of a nonmagnetic material, a magnetic material being secured to said tuning fork, and
said excitation means is composed of an electromagnet for applying a magnetic field, the strength of which changes periodically, to said tuning fork, and a driving circuit for operating said electromagnet, and
wherein said driving circuit selectively feeds a driving current, the magnitude of which can be adjusted for scanning said sample at the frequency of the first overtone of said tuning fork, or a driving current, the magnitude of which can be adjusted for scanning said sample at the frequency of the third overtone of said tuning fork, to said electromagnet.

4. A scanning microscope comprising:
i) a sample supporting member on which a sample is supported,
ii) an optical means which focuses a light beam as a light spot on said sample,
iii) a movement mechanism which moves said optical means with respect to said sample supporting member such that said light spot scans said sample, and
iv) a means for photoelectrically detecting light radiated out of the portion of said sample, which is exposed to said light spot, an image of said sample being thereby formed,
wherein said movement mechanism for moving said optical means or said sample supporting member is constituted of:
a) a tuning fork on which said optical means or said sample supporting member is supported, and
b) an excitation means for applying force, the magnitude of which changes periodically, to said tuning fork, and thereby causing said tuning fork to resonate such that a resonating frequency of said tuning fork is varied depending upon the width and length of said tuning fork,
wherein said excitation means is constituted of a piezo-electric device, which is secured to said tuning fork, and a driving circuit for applying a voltage, the magnitude of which changes periodically, to said piezo-electric device, and
wherein said driving circuit selectively feeds a driving voltage, the magnitude of which can be adjusted for scanning said sample at the frequency of the first overtone of said tuning fork, or a driving current, the magnitude of which can be adjusted for scanning said sample at the frequency of the third overtone of said tuning fork, to said piezo-electric device.

5. A scanning microscope comprising:
i) a sample supporting member on which a sample is supported,
ii) an optical means which focuses a light beam as a light spot on said sample,
iii) a movement mechanism which moves said optical means with respect to said sample supporting member such that said light spot scans said sample, and
iv) a means for photoelectrically detecting light radiated out of the portion of said sample, which is exposed to said light spot, an image of said sample being thereby formed,
wherein said movement mechanism for moving said optical means or said sample supporting member is constituted of:
a) a tuning fork on which said optical means or said sample supporting member is supported, and
b) an excitation means for applying force, the magnitude of which changes periodically, to said tuning fork, and thereby causing said tuning fork to resonate such that a resonating frequency of said tuning fork is varied depending upon the width and length of said tuning fork, said tuning fork being constituted of a magnetic material; and
wherein said excitation means is constituted of a piezo-electric device, which is secured to said tuning fork, and a driving circuit for applying a voltage, the magnitude of which changes periodically, to said piezo-electric device, and
wherein said driving circuit selectively feeds a driving voltage, the magnitude of which can be adjusted for scanning said sample at the frequency of the first overtone of said tuning fork, or a driving current, the magnitude of which can be adjusted for scanning said sample at the frequency of the third overtone of said tuning fork, to said piezo-electric device.

6. A scanning mechanism comprising:
i) a material supporting member on which a material to be scanned is supported,
ii) an optical means which focuses a light beam as a light spot on said material to be scanned and
iii) a movement mechanism which moves said optical means with respect to said sample supporting member such that said light spot scans said material to be scanned,
wherein said movement mechanism for moving said optical means or said material supporting member comprises:
a) a tuning fork on which said optical means or said material supporting member is supported, said tuning fork being constituted of a magnetic material, and b) an excitation means for applying force, the magnitude of which changes periodically, to said tuning fork, and thereby causing said tuning fork to resonate such that a resonating frequency of said tuning fork is varied depending upon the width and length of said tuning fork, wherein said excitation means is composed of an electromagnetic for applying a magnetic field, the strength of which changes periodically, to said tuning fork, and a driving circuit for operating said electromagnet, and wherein said driving circuit selectively feeds a driving current, the magnitude of which can be adjusted for scanning said sample at the frequency of the first overtone of said tuning fork, or a driving current, the magnitude of which can be adjusted for scanning said sample at the frequency of the third overtone of said tuning fork, to said electromagnet.

7. A scanning mechanism comprising:
i) a material supporting member on which a material to be scanned is supported,
ii) an optical means which focuses a light beam as a light spot on said material to be scanned, and
iii) a movement mechanism which moves said optical means with respect to said sample supporting member such that said light spot scans said material to be scanned,
wherein said movement mechanism for moving said optical means or said material supporting member comprises:
a) a tuning fork on which said optical means or said material supporting member is supported, said tuning fork being constituted of a magnetic material, and
b) an excitation means for applying force, the magnitude of which changes periodically, to said tuning fork, and thereby causing said tuning fork to resonate such that a resonating frequency of said tuning fork is varied depending upon the width and length of said tuning fork,
wherein said excitation means is composed of an electromagnet for applying a magnetic field, the strength of which changes periodically, to said tuning fork, and a driving circuit for operating said electromagnet, said electromagnet being formed by winding an exciting coil around said tuning fork, and
wherein said driving circuit selectively feeds a driving current, the magnitude of which can be adjusted for scanning said sample at the frequency of the first overtone of said tuning fork, or a driving current, the magnitude of which can be adjusted for scanning said sample at the frequency of the third overtone of said tuning fork, to said electromagnet.

8. A scanning mechanism comprising:
i) a sample supporting member on which a material to be scanned is supported,
ii) an optical means which focuses a light beam as a light spot on said material to be scanned, and
iii) a movement mechanism which moves said optical means with respect to said sample supporting member such that said light spot scans said material to be scanned,
wherein said movement mechanism for moving said optical means or said material supporting member comprises:
a) a tuning fork on which said optical means or said material supporting member is supported, and
b) an excitation means for applying force, the magnitude of which changes periodically, to said tuning fork, and thereby causing said tuning fork to resonate such that a resonating frequency of said tuning fork is varied depending upon the width and length of said tuning fork, said tuning fork being constituted of a magnetic material,
wherein a magnetic material is secured to said tuning fork, and
said excitation means is composed of an electromagnet for applying a magnetic field, the strength of which changes periodically, to said tuning fork, and a driving circuit for operating said electromagnet, and
wherein said driving circuit selectively feeds a driving current, the magnitude of which can be adjusted for scanning said sample at the frequency of the first overtone of said tuning fork, or a driving current, the magnitude of which can be adjusted for scanning said sample at the frequency of the third overtone of said tuning fork, to said electromagnet.

9. A scanning mechanism comprising:
i) a sample supporting member on which a material to be scanned is supported,
ii) an optical means which focuses a light beam as a light spot on said material to be scanned, and
iii) a movement mechanism which moves said optical means with respect to said sample supporting member such that said light spot scans said material to be scanned,
wherein said movement mechanism for moving said optical means or said material supporting member comprises:
a) a tuning fork on which said optical means or said sample supporting member is supported, and
b) an excitation means for applying force, the magnitude of which changes periodically, to said tuning fork, and thereby causing said tuning fork to resonate such that a resonating frequency of said tuning fork is varied depending upon the width and length of said tuning fork,
wherein said excitation means is constituted of a piezo-electric device, which is secured to said tuning fork, and a driving circuit for applying a voltage, the magnitude of which changes periodically, to said piezo-electric device, and
wherein said driving circuit selectively feeds a driving voltage, the magnitude of which can be adjusted for scanning said sample at the frequency of the first overtone of said tuning fork, or a driving current, the magnitude of which can be adjusted for scanning said sample at the frequency of the third overtone of said tuning fork, to said piezo-electric device.

10. A scanning mechanism comprising:
i) a sample supporting member on which a material to be scanned is supported,
ii) an optical means which focuses a light beam as a light spot on said material to be scanned, and
iii) a movement mechanism which moves said optical means with respect to said sample supporting member such that said light spot scans said material to be scanned, wherein said movement mechanism for moving said optical means or said material supporting member comprises:
a) a tuning fork on which said optical means or said material supporting member is supported, and
b) an excitation means for applying force, the magnitude of which changes periodically, to said tuning fork, and thereby causing said tuning fork to resonate such that a resonating frequency of said tuning fork is varied depending upon the width and length of said tuning fork, said tuning fork being constituted of a non-magnetic material, wherein said excitation means is constituted of a piezo-electric device, which is secured to said tuning fork, and a driving circuit for applying a voltage, the magnitude of which changes periodically, to said piezo-electric device, and wherein said driving circuit selectively feeds a driving voltage, the magnitude of which can be adjusted for scanning said sample at the frequency of the first overtone of said tuning fork, or a driving current, the magnitude of which can be adjusted for scanning said sample at the frequency of the third overtone of said tuning fork, to said piezo-electric device.

* * * * *